(12) United States Patent
Furst (10) Patent No.: US 8,472,691 B2
(45) Date of Patent: Jun. 25, 2013

(54) METHOD FOR ASCERTAINING THE POSITION OF A STRUCTURE IN A BODY (75) Inventor: Armin Furst, Erlangen (DE)

(73) Assignee: Brainlab AG, Feldkirchen (DE)

( * ) Notice: Subject to any disclaimer, the term of this patent is extended or adjusted under 35 U.S.C. 154(b) by 489 days.

(21) Appl. No.: 12/726,382

(22) Filed: Mar. 18, 2010

(65) Prior Publication Data

US 2010/0239152 A1    Sep. 23, 2010

Related U.S. Application Data (60) Provisional application No. 61/183,609, filed on Jun. 3, 2009.

(30) Foreign Application Priority Data

Mar. 18, 2009    (EP) .................................... 09155433

(51) Int. Cl.
G06K 9/00    (2006.01)
(52) U.S. Cl.
USPC .............................................. 382/132; 705/2
(58) Field of Classification Search
USPC .......................................................... 382/132
See application file for complete search history.

(56) References Cited

U.S. PATENT DOCUMENTS

| 7,154,985 B2 * | 12/2006 | Dobbs et al. ...................... 378/4 |
| 7,593,602 B2 * | 9/2009 | Stentiford ...................... 382/305 |
| 2010/0228340 A1 * | 9/2010 | Erbel et al. .................... 623/1.18 |

OTHER PUBLICATIONS

European Search Report for corresponding application No. EP 09 15 5433 dated Oct. 21, 2009.

Larry E. Antonuk, "Electronic portal imaging devices: a review and historical perspective of contemporary technologies and research", Institute of Physics Publishing, Phys. Med. Biol. 47 (2002) R 31-R65.
Bansal et al., "Entropy-Based, Multiple-Portal-to-3DCT Registration for Prostate Radiotherapy Using Iteratively Estimated Segmentation", pp. 567-579.
Chelikani, Ph.D. et al., "A Gradient Feature Weighted Minimax Algorithm for Registration of Multiple Portal Images to 3DCT Volumes in Prostate Radiotherapy", Int. Journal of Radiation Oncology Biol. Phys., vol. 65, No. 2, 2006, pp. 535-547.

(Continued)

Primary Examiner — Hiep V Nguyen
(74) Attorney, Agent, or Firm — Renner, Otto, Boisselle & Sklar, LLP (57) ABSTRACT

A method for ascertaining the position of a structure in a body, comprising the method steps of:
  providing 3D data which represents a three-dimensional image of at least the part of the body which contains the structure;
  providing at least two 2D image data sets which each represent an x-ray image of a part of the body containing at least the structure, from a known viewing direction;
  generating virtual x-ray images from the 3D data for a virtual position of the 3D data, wherein for each viewing direction for which a 2D image data set has been provided, a corresponding virtual x-ray image is generated;
  comparing the virtual x-ray images in pairs with the corresponding 2D image data sets and generating a cumulative degree of similarity for the virtual position of the 3D data from all the comparisons;
  repeating the steps of generating virtual x-ray images, comparing in pairs and generating a cumulative degree of similarity for different virtual positions of the 3D data; and
  ascertaining the position of the structure in the body from the virtual position of the 3D data which results in the greatest cumulative degree of similarity.

15 Claims, 4 Drawing Sheets

OTHER PUBLICATIONS

Fu et al., "Fiducial-less 2D-3D Spine Image Registration Using Spine Region Segmented in CT Image", SPIE Digital Library, Oct. 2009, http://spiedl.org/terms.

Russakoff, Ph.D., Intensity-Based 2D-3D Spine Image Registration Incorporating a Single Fiducial Marker[1], Academic Radiology, Vol. 12, No. 1, Jan. 2005, pp. 37-49.

Sansone et al., "3D Pose Estimation of Biological Tissues by means of CT and Fluoroscopy", Proceedings of the $22^{nd}$ Annual EMBS International Conference, Jul. 2000, pp. 2426-2427.

Weese et al., "Voxel-Based 2-D/3-D Registration of Fluoroscopy Images and CT Scans for Image-Guided Surgery", IEEE Transactions on Information Technology in Biomedicine, vol. 1, No. 4, Dec. 1997, pp. 284-293.

* cited by examiner

METHOD FOR ASCERTAINING THE POSITION OF A STRUCTURE IN A BODY

RELATED APPLICATION DATA

This application claims the priority of U.S. Provisional Application No. 61/183,609, filed on Jun. 3, 2009, which is hereby incorporated in its entirety by reference.

FIELD OF THE INVENTION

The present invention relates to a method, a device and a computer program for ascertaining the position of a structure in a body, in particular a human or animal body.

BACKGROUND OF THE INVENTION

In order to prepare a patient's treatment, it is often necessary to know the is exact position of a structure in the body, in particular in relation to an external reference point. The structure is for example a tumor which is to be irradiated or removed. The structure can also be other structures such as for example a bone or an organ.

SUMMARY OF THE INVENTION

It is the object of the present invention to provide a method, device and computer program using which the position of the structure in the body can be simply, quickly and/or reliably ascertained.

This object is solved by a method for ascertaining the position of a structure in a body, comprising the method steps of: providing 3D data which represents a three-dimensional image of at least the part of the body which contains the structure; providing at least two 2D image data sets which each represent an x-ray image of a part of the body containing at least the structure, from a known viewing direction; generating virtual x-ray images from the 3D data for a virtual position of the 3D data, wherein for each viewing direction for which a 2D image data set has been provided, a corresponding virtual x-ray image is generated; comparing the virtual x-ray images in pairs with the corresponding 2D image data sets and generating a cumulative degree of similarity for the virtual position of the 3D data from all the comparisons; repeating the steps of generating virtual x-ray images, comparing in pairs and generating a cumulative degree of similarity for different virtual positions of the 3D data; and ascertaining the position of the structure in the body from the virtual position of the 3D data which results in the greatest cumulative degree of similarity; and by a device for ascertaining the position of a structure in a body, comprising: an interface, designed to receive 3D data which represents a three-dimensional image of at least the part of the body which contains the structure, and to receive at least two 2D image data sets which each represent an x-ray image of a part of the body containing at least the structure, from a known viewing direction; a computational unit, designed to: generate virtual x-ray images from the 3D data for a virtual position of the 3D data, wherein for each viewing direction for which a 2D image data set has been provided, a corresponding virtual x-ray image is generated; compare the virtual x-ray images in pairs with the corresponding 2D image data sets; and generate a cumulative degree of similarity for the virtual position of the 3D data, from all the comparisons, wherein the computational unit is also designed to repeat the steps of generating virtual x-ray images, comparing in pairs and generating a cumulative is degree of similarity for different virtual positions of the 3D data, and to ascertain the position of the structure in the body from the virtual position of the 3D data which results in the greatest cumulative degree of similarity; and by a computer program which, when it is executed on a data processing device, causes the data processing device to perform the above method. Advantageous embodiments may be gathered from the dependent claims.

Within the framework of this document, the term "position" signifies a combination of the location and/or orientation of an object, i.e. of its translational and/or rotational state.

In accordance with the invention, 3D data is firstly provided which represents a three-dimensional image of at least the part of the body which contains the structure. The position of the structure within the 3D data is known or ascertained, for example automatically. Said 3D data is preferably a three-dimensional array of values, wherein each value represents for example the density, the absorbability with respect to x-ray radiation or the transmissibility with respect to x-ray radiation of an assigned spatial element of the body. The 3D data thus consists of a multitude of voxels which are each assigned to a spatial region of the body. The 3D data is for example generated by means of a computed tomograph (CT), a magnetic resonance tomograph (MRT) or other device for spatial imaging. Generating the 3D data presupposes a corresponding period of time and a three-dimensional imaging device, such that it is often not possible to generate the 3D data and ascertain the position of the structure directly from said data, directly before the patient's treatment. The 3D data is therefore preferably generated in advance and provided to the method in accordance with the invention for ascertaining the position of the structure, wherein said method is advantageously performed directly before the treatment.

Where data, regions, ranges or images are "provided", this means that they are ready for use by the method in accordance with the invention. The data or images can achieve this state of being "provided" by for example being detected or captured (for example by analysis apparatuses) or by being input (for example via interfaces). The data can also have this state by being stored in a memory (for example a ROM, CD and/or hard drive) and thus ready for use within the framework of the method in accordance with the invention, for example by a computational unit such as for example a computer.

At least two, in particular at least three, 2D image data sets are also provided which each represent an x-ray image of a part of the body which at least contains the is structure, from a known viewing direction. Correspondingly, the x-ray images show the structure and the surrounding part of the body in different projections, the positions of which with respect to each other are known. The x-ray images can be obtained directly before the patient's treatment, such that the position of the patient and thus the position of the structure does not change between generating the x-ray images and the patient's treatment which follows the method in accordance with the invention.

In a subsequent portion of the method, virtual x-ray images are generated from the 3D data for a virtual position of the 3D data, wherein for each viewing direction for which a 2D image data set has been provided, a corresponding virtual x-ray image is generated. The virtual position of the 3D data is for example in relation to a reference, in particular the viewing directions of the x-ray images or a reference coordinate system. Generating virtual x-ray images, also referred to as DRR (digitally reconstructed radiography), is known from the prior art, wherein a virtual x-ray image which would result if the body represented by the 3D data were x-rayed from the base direction is calculated from the 3D data. The virtual x-ray images are represented by DRR data sets, wherein each DRR data set contains a virtual x-ray image. Since for each viewing direction for which a 3D image data set has been provided, a corresponding virtual x-ray image is generated, both an actual x-ray image and a virtual x-ray image in the form of data and/or data sets are then available for each viewing direction.

The DRR data sets, i.e. the virtual x-ray images, are then compared in pairs with the corresponding 2D image data sets, which results in a degree of similarity for each pair of images compared. A cumulative degree of similarity is then generated for the virtual position of the 3D data, from all the comparisons. The cumulative degree of similarity is a measure of the similarity and/or match between all the virtual x-ray images and the corresponding 2D image data sets.

Using at least two pairs of images reduces the influence of image noise or undesired structures in the images. The higher the number of pairs of images, the more reliably the ascertained position of the structure matches the actual position. The cost of for example ascertaining the 2D image data sets needed increases, however, as the number of pairs of images increases. As a compromise between the reliability of the ascertained position and the cost of obtaining the 2D image data sets, between two and twenty, in particular between two or three and eight, 2D image data sets are preferably used.

Within the framework of the method in accordance with the invention, the steps of generating the virtual x-ray images, comparing in pairs and generating the cumulative degree of similarity are repeated for different virtual positions of the 3D data. This results in a cumulative degree of similarity for each virtual position of the 3D data. Lastly, the position of the structure in the body is ascertained from the virtual position of the 3D data which results in the greatest degree of similarity. The position of the structure in the body is in particular ascertained from the position of the 3D data and the position of the structure within the 3D data, for example in relation to an external reference point or a reference coordinate system. The viewing directions for which the 2D image data sets have been provided are in particular known in relation to the reference point or the reference coordinate system. Since the viewing directions when generating the x-ray image match the viewing directions of the virtual x-ray images, the position of the 3D data—and from this, the position of the structure —in relation to the viewing directions is thus known.

Advantageously, the x-ray images represented by the 2D image data sets each represent the body in the same state. This state is in particular the breathing state, since the position of the structure in relation to the reference may change during the breathing cycle. One way of acquiring a plurality of x-ray images during the same state is to simultaneously generate a plurality of x-ray images from different viewing directions. To this end, one x-ray apparatus for each viewing direction is required. Alternatively or additionally, the state of the body is monitored, and the x-ray images are generated or selected from a number of sequentially generated x-ray images when the body is situated in a defined state. The defined state is for example the state in which the patient has completely breathed in or out.

In one embodiment of the invention, the cumulative degree of similarity is calculated as the sum of the individual degrees of similarity of the n comparisons in pairs. The parameter n corresponds to the number of 2D image data sets. The cumulative degree of similarity $F_{cumm}$ is then calculated on the basis of the formula:

$$F_{cumm}(I_1 \ldots I_n, DRR_1 \ldots DRR_n) = \sum_{i=1}^{n} F(I_i, DRR_i)$$

using the degree of similarity $F(I_i, DRR_i)$ of the respective pair of images i, wherein I represents a 2D image data set and DRR represents a virtual x-ray image.

Alternatively, the cumulative degree of similarity is calculated as the product of the individual degrees of similarity of the n comparisons in pairs. In this case, the cumulative degree of similarity $F_{cumm}$ is calculated as:

$$F_{cumm}(I_1 \ldots I_n, DRR_1 \ldots DRR_n) = \prod_{i=1}^{n} F(I_i, DRR_i).$$

In one embodiment of the invention, a penalty is additionally incorporated into the cumulative degree of similarity and depends on the deviation between the respective virtual position of the 3D data and an initial position. The initial position is for example selected as the virtual position which corresponds to the presumed actual position of the patient's body. If, for example, it is known that the patient is lying on their back, then the penalty prevents the virtual position of the 3D data which corresponds to the patient lying on their stomach from being adduced for ascertaining the position of the structure in the body. When incorporating the penalty, the cumulative degree of similarity is for example divided by the penalty, or the penalty is subtracted from the cumulative degree of similarity.

When the virtual x-ray images are compared in pairs with the corresponding 2D image data sets, the influence of undesired structures is preferably suppressed. This is for example achieved by segmenting the 3D data before generating the virtual x-ray images, wherein for example all the voxels of the 3D data which are not to be assigned to the desired structure are suppressed. The virtual x-ray images are thus obtained exclusively from the 3D data which is to be assigned to the desired structure.

Alternatively or additionally, the virtual x-ray images are masked before the comparison in pairs. This means that regions of the virtual x-ray images which do not contain the desired structure are blanked out.

Alternatively or additionally, the 3D data is modified in regions which do not contain the structure, before generating the virtual x-ray images, wherein for example the density values of the voxels which are not to be assigned to the structure are changed, for example set to the value zero or to the density value of water.

Alternatively or additionally, the 3D data is also filtered before generating the virtual x-ray images. A windowing filter is for example used which increases the contrast of the relevant density values in the 3D data.

The method in accordance with the invention is in particular a data processing method. The data processing method is preferably performed using technical means, in particular a computer. The computer in particular comprises a processor and in particular a memory in order to process the data, in particular electronically. The steps described, such as for example the providing steps, repeating steps for ascertaining, generating steps or comparing steps, are in particular performed by a computer. Steps of comparing data are in particular steps of the technical data processing method, in particular within the framework of a program, and are in particular performed on the basis of predefined criteria or methods. Generating steps in particular represent a calculation on the basis of data by means of the computer. Ascertaining steps in particular comprise retrieving values which are provided at an interface of the computer and have been generated using technical means such as for example a scanning device or an image forming device. These values are in particular converted by the interface into data which can be processed by the computer.

The invention also relates to a device for ascertaining the position of a structure in a body, comprising a data interface and a computational unit. The interface is designed to receive 3D data which represents a three-dimensional image of at least the part of the body which contains the structure, and to receive at least two, in particular at least three, 2D image data sets which each represent an x-ray image of a part of the body containing at least the structure, from a known viewing direction. The computational unit is designed to: generate virtual x-ray images, in the form of DRR data sets, from the 3D data, wherein for each viewing direction for which a 2D image data set has been provided, a corresponding virtual x-ray image and/or DRR data set is generated; compare the virtual x-ray images and/or DRR data sets in pairs with the corresponding 2D image data sets; and generate a cumulative degree of similarity for the virtual position of the 3D data, from all the comparisons. The computational unit is also designed to repeat the steps of generating virtual x-ray images, comparing in pairs and generating a cumulative degree of similarity for different virtual positions of the 3D data, and to ascertain the position of the structure in the body from the virtual position of the 3D data which results in the greatest degree of similarity. The device is correspondingly designed to perform the method in accordance with the invention.

In one embodiment of the invention, the device comprises at least two x-ray apparatuses which have a known geometric arrangement with respect to each other. By using a plurality of x-ray apparatuses, it is possible to simultaneously obtain 2D image data sets from a plurality of viewing directions. The viewing directions of the 2D image data sets are known from the known geometric arrangement of the x-ray apparatuses with respect to each other. Within the framework of the present invention, between two and ten x-ray apparatuses are preferably used, particularly preferably between three and five x-ray apparatus.

Alternatively or additionally, the device comprises a sensor for monitoring the state of the body. Image forming by means of the x-ray apparatuses is triggered in accordance with the output signal of the sensor. Alternatively, the x-ray apparatuses continuously generate 2D image data sets, and the 2D image data sets which are compared with the virtual x-ray images are selected on the basis of the output signal of the sensor. The sensor is for example an infrared camera using which the rise of a patient's breast and therefore their breathing state can for example be monitored.

The invention also relates to a computer program which, when it is executed on a data processing system, causes the data processing system to perform the method described above.

Computer program elements within the framework of the invention can be embodied by hardware and/or software (this also includes firmware, resident software, micro-code, etc.). Computer program elements within the framework of the invention can take the form of a computer program product which can be embodied by a computer-usable or computer-readable storage medium comprising computer-usable or computer-readable program instructions, "code" or a "computer program" embodied on said medium for use on or in connection with the instruction-executing system. Such a system can be a computer; a computer can be a data processing device comprising means for executing the computer program elements and/or the program in accordance with the invention. Within the context of this invention, a computer-usable or computer-readable medium can be any medium which can contain, store, communicate, propagate or transport the program for use on or in connection with the instruction-executing system, apparatus or device. The computer-usable or computer-readable medium can for example be, but is not limited to, an electronic, magnetic, optical, electromagnetic, infrared or semiconductor system, apparatus or device or a medium of propagation such as for example the Internet. The computer-usable or computer-readable medium could even for example be paper or another suitable medium onto which the program is printed, since the program could be electronically captured, for example by optically scanning the paper or other suitable medium, and then compiled, interpreted or otherwise processed in a suitable manner. The computer program product and any software and/or hardware described herein form the various means for performing the functions of the invention in the example embodiments. The computer and/or data processing device can in particular constitute a guidance information device which includes means for outputting guidance information. The guidance information can be output, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or vibration element incorporated in an instrument).

It is possible within the framework of the invention to combine a plurality of the aforesaid features to form embodiments, and to omit features which are not essential to the invention.

BRIEF DESCRIPTION OF THE DRAWINGS

The invention shall be explained in more detail on the basis of example embodiments.

DETAILED DESCRIPTION

Figure 1:
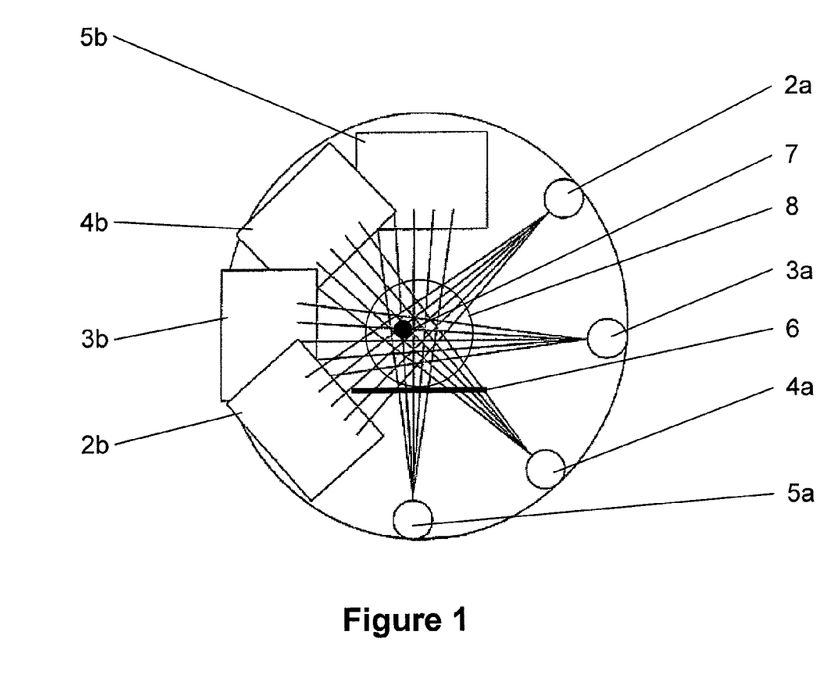
FIG. 1 shows an arrangement comprising four x-ray apparatuses.

FIG. 1 shows an arrangement of four x-ray apparatuses 2, 3, 4 and 5, wherein each x-ray apparatus consists of an x-ray source 2a, 3a, 4a and 5a and a detector 2b, 3b, 4b and 5b assigned to an x-ray source. The spatial arrangement of the x-ray apparatuses 2 to 5 with respect to each other is known, for example in relation to a reference point or reference coordinate system. The x-ray apparatuses detect a region above a table 6 which is shown as a bar in FIG. 1. A body 8, which is shown as a circle and contains a structure 7, is situated on the table 6. The structure 7 is shown as a circular disc. The device 1 serves to ascertain the position of the structure 7 in the body 8, in particular in relation to the position of the reference point or a reference coordinate system. The reference coordinate system is for example defined on the basis of the position of the table 6 or the viewing directions of the x-ray apparatuses 2 to 5.

Figure 2:
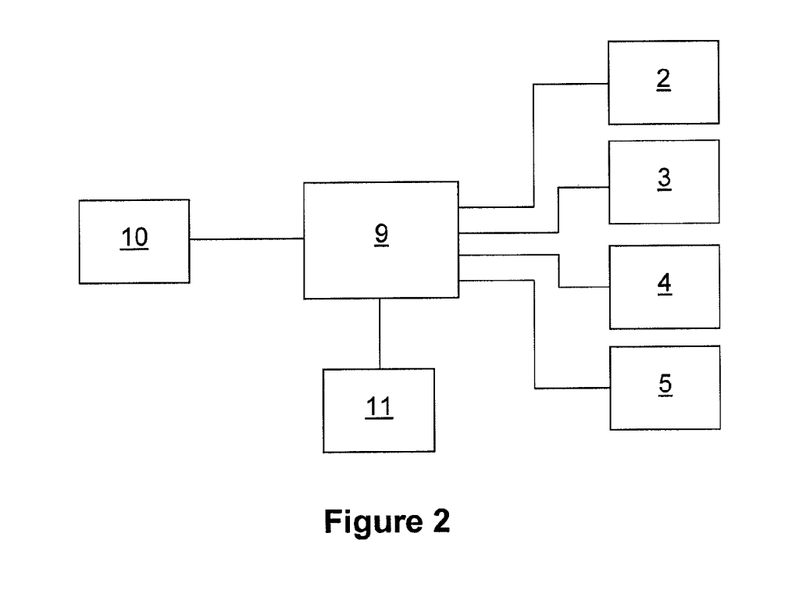
FIG. 2 shows a schematic representation of the device, comprising the arrangement from FIG. 1.

As can be seen from FIG. 2, the device 1 comprises a computational unit 9 which is connected to the x-ray apparatuses 2, 3, 4 and 5. The computational unit 9 is also connected to a memory 10 and an optional beam generator 11. "Connected" means that two components can transmit data to each other in at least one direction. The memory 10 serves to provide data to the computational unit 9, for example 3D data which represents a three-dimensional image of at least the part of the body 8 which contains the structure 7.

The detection range of the x-ray apparatuses 2 to 5 is schematically shown in FIG. 1 by five beams in each case. The x-ray apparatuses operate for example in the kilovolt or megavolt range. The beam generated by the x-ray sources is for example shaped as a cone. When in operation, the four x-ray apparatus 2 to 5 simultaneously generate four x-ray images, each of a part of the body 8 containing at least the structure 7, from a known viewing direction. The x-ray images are represented by corresponding 2D image data sets. The 2D image data sets are provided to the computational unit 9 by the x-ray apparatuses. The computational unit 9 then generates virtual x-ray images from the 3D data for a virtual position of the 3D data in relation to the reference, for example the table 6, wherein for each viewing direction for which a 2D image data set has been provided, a corresponding virtual x-ray image is generated. The virtual x-ray images, which are represented by DRR data sets, are then compared in pairs with the corresponding 2D image data sets, and a cumulative degree of similarity is generated for the virtual position of the 3D data, from all the comparisons. The steps of generating the virtual x-ray images, comparing in pairs and generating the cumulative degree of similarity are then repeated for different virtual positions of the 3D data.

Generating a degree of similarity from an image comparison in pairs is known from the prior art and is therefore not explained in detail at this point. Each image comparison results in a value as a degree of similarity, wherein the values for all the pairs of images are combined to form a cumulative degree of similarity. The individual degrees of similarity are combined for example by being added or multiplied by each other.

Figure 5:
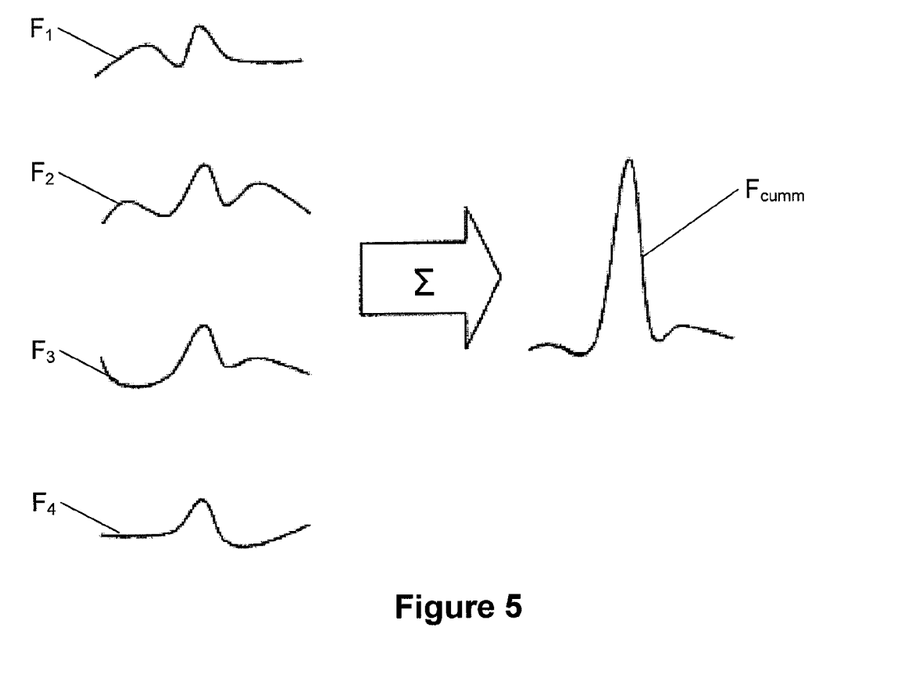
FIG. 5 shows generating the cumulative degree of similarity.

By way of example, FIG. 5 shows the profiles of the individual degrees of similarity $F_1$ to $F_4$ of four pairs of images over the rotational angle of the 3D data about an axis. In practice, the virtual position of the 3D data is composed of up to three translations and up to three rotations. A degree of similarity correspondingly depends on up to six parameters and correspondingly represents a quantity of values in an at most six-dimensional space.

In FIG. 5, the graph $F_1$ represents the profile of the degree of similarity of the comparison between the x-ray image of the x-ray apparatus 2 and the corresponding virtual x-ray image. The graphs $F_2$, $F_3$ and $F_4$ correspondingly represent the profile of the degree of similarity of the image comparison between the x-ray image of the x-ray apparatus 3, 4 and 5, respectively, and the respective corresponding virtual x-ray image.

FIG. 5 also shows the profile of the cumulative degree of similarity $F_{cumm}$, which in the present example is calculated as the sum of the four degrees of similarity $F_1$ to $F_4$. It becomes clear that the maximum of this cumulative degree of similarity is more pronounced than the maxima of the individual degrees of similarity. This is due to the fact that cumulating averages out disturbance variables such as for example the influence of image noise or disruptive structures in the body.

Lastly, the position of the structure 7 is ascertained from the virtual position of the 3D data which results in the greatest cumulative degree of similarity. Since the viewing directions of the four x-ray apparatuses 2 to 5 and therefore the viewing directions of the four virtual x-ray images are known in relation to the reference, the selected virtual position of the 3D data is also known in relation to the reference. Since the position of the structure in the 3D data is known, the position of the structure in relation to the reference is thus also known.

Optionally, the cumulative degree of similarity is additionally provided with a penalty, for example by dividing or subtracting. The penalty increases for example as the deviation between the virtual position of the 3D data and an initial position increases. The initial position is the virtual position of the 3D data which corresponds to the position in which the body 8 is most probably situated. If, for example, the body 8 is situated in a supine position on the table 6, then the virtual position corresponding to this supine position is assumed as the initial position for the 3D data when rotating the 3D data about the spinal axis. Applying the penalty changes the cumulative degree of similarity, such that improbable virtual positions of the 3D data, i.e. positions which deviate significantly from the initial position, result in a lower cumulative degree of similarity.

Figure 6A:
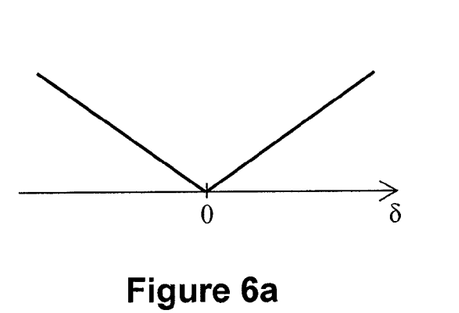
FIGS. 6a-6c show possible profiles for a penalty.
Figure 6B:
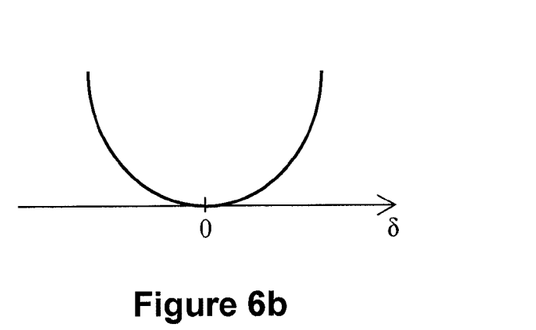
Figure 6C:
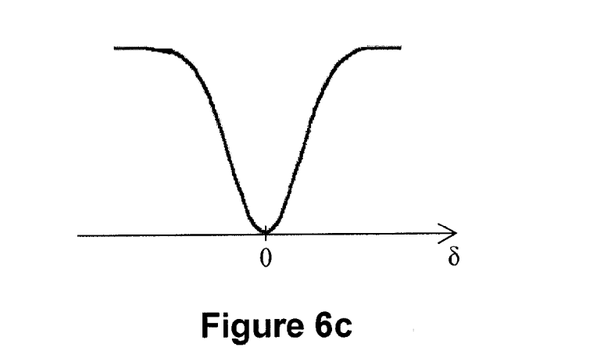

Possible profiles of the penalty are shown in FIGS. 6a-6c. The penalty shown in FIG. 6a increases linearly from the initial position 0 as the deviation δ increases. The penalty shown in FIG. 6b increases exponentially. The penalty shown in FIG. 6c shows an inverse Gauss distribution. It is possible to apply an individual penalty for each dimension of the virtual position of the 3D data. Thus, for example, a different penalty is used for a virtual rotation of the 3D data in the transversal plane of the body 8 than for a rotation in the frontal plane.

The computational unit 9 is also optionally connected to a beam generator 11. The beam generator serves for example for irradiation, if the structure 7 is a tumor. The computational unit preferably communicates the position of the tumor 7 to the beam generator 11, which aligns the beam on the basis of the communicated position of the tumor 7.

Figure 3:
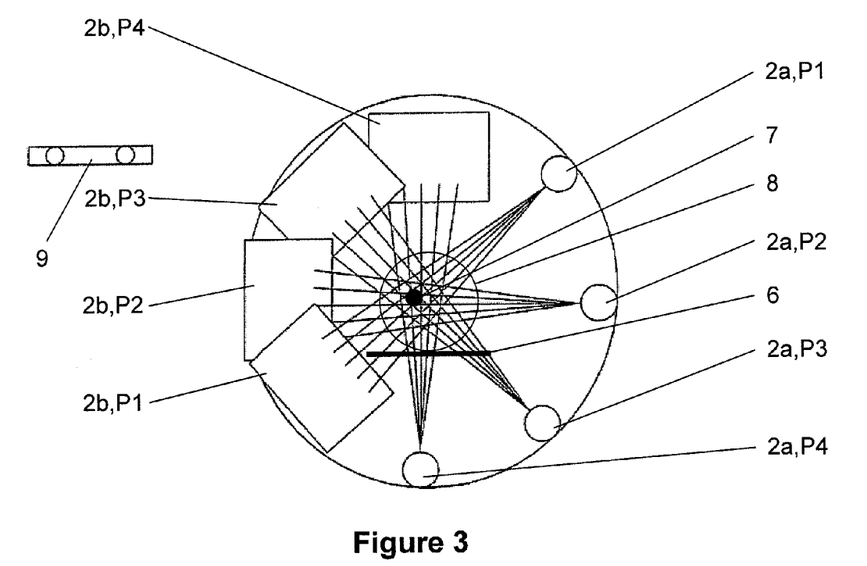
FIG. 3 shows, an arrangement comprising an x-ray apparatus and a state sensor.
Figure 4:
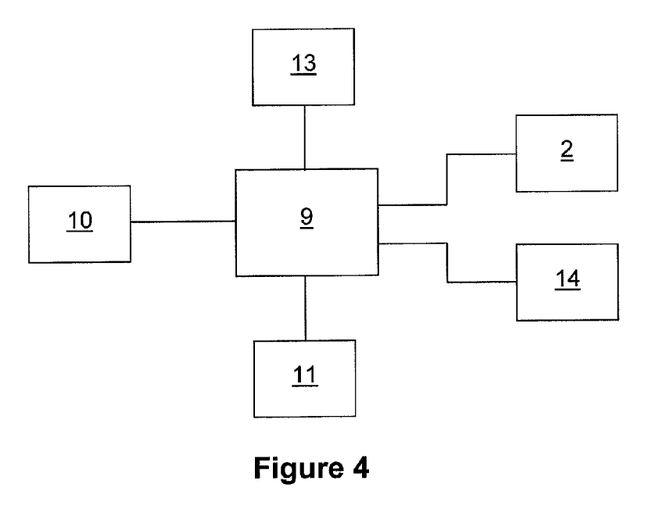
FIG. 4 shows a schematic representation of the device, comprising the arrangement from FIG. 3.

FIG. 3 shows an arrangement of a device 12 which is schematically shown in FIG. 4. The structure of the device 12 is similar to that of the device 1, such that components which act in the same way have been provided with the same reference signs and will not be explained again. Unlike the device 1, the device 12 has only one x-ray apparatus 2 comprising an x-ray source 2a and a detector 2b. The viewing direction of the x-ray apparatus 2 can however be changed by means of an actuating unit 14 which is connected to the computational unit 9. The x-ray apparatus 2 can preferably be rotated about an axis, such that the actuating unit 14 is for example a motor.

FIG. 3 shows the x-ray apparatus 2 in four positions, such that x-ray images can be generated from four viewing directions. The four positions are indicated by the reference signs P1 to P4.

For ascertaining the position of the structure 7, it is necessary for the four x-ray images to each show the body 8 in the same state, since the position of the structure 7 can for example change during the breathing cycle. The computational unit 9 is therefore additionally connected to a state sensor 13. The state sensor 13 is for example an infrared camera which is directed onto the body 8 and serves to detect the state of the body 8. The infrared camera ascertains for example the rise and fall of the ribcage of the body 8 during breathing. In order to obtain the four x-ray images in the same state of the body 8, the x-ray image is for example generated in each of the positions P1 to P4 at a point in time at which the body 8 is situated in a defined state. This defined state is for example a dead point in the breathing cycle, at which the patient has fully breathed in or out, respectively. Another option is to continuously generate x-ray images in each of the positions P1 to P4 and to select the x-ray image generated at the point in time at which the body 8 was situated in the defined state.

The extent to which the state is ascertained in the state sensor 13 or in the computational unit 9 is left to the implementing person skilled in the art. In one is extreme case, the state sensor 13 only generates a series of images which are evaluated completely in the computational unit 9. In the other extreme case, they are evaluated completely in the state sensor 13, which merely communicates a triggering signal for generating the x-ray image to the computational unit 9.

Once the x-ray images have been generated in the four positions P1 to P4 and stored in corresponding 2D image data sets, then the position of the structure 7 is ascertained in the same way as by the device 1. The type of device merely influences the way in which the 2D image data sets which are provided for the method in accordance with the invention are generated.

The state signal of the state sensor 13 is preferably forwarded to the beam generator 11. This means that the treatment beam is only switched on when the body 8 is situated in a defined state and the tumor is thus situated in a corresponding position. Alternatively, the position of the structure 7 is calculated for different states of the body 8, and the beam of the beam generator 11 is guided depending on the state of the body 8 as ascertained by the state sensor 13. The position of the structure 7 is for example calculated in both dead points of the breathing cycle and interpolated for the states between the two dead points.

Computer program elements of the invention may be embodied in hardware and/or software (including firmware, resident software, micro-code, etc.). The computer program elements of the invention may take the form of a computer program product which may be embodied by a computer-usable or computer-readable storage medium comprising computer-usable or computer-readable program instructions, "code" or a "computer program" embodied in said medium for use by or in connection with the instruction executing system. Within the context of this application, a computer-usable or computer-readable medium may be any medium which can contain, store, communicate, propagate or transport the program for use by or in connection with the instruction executing system, apparatus or device. The computer-usable or computer-readable medium may for example be, but is not limited to, an electronic, magnetic, optical, electro-magnetic, infrared or semiconductor system, apparatus, device or medium of propagation, such as for example the Internet. The computer-usable or computer-readable medium could even for example be paper or another suitable medium on which the program is printed, since the program could be electronically captured, for example by optically scanning the paper or other suitable medium, and then compiled, interpreted or otherwise processed in a suitable manner. The computer program product and any software and/or hardware described here form the various means for performing the functions of the invention in the example embodiment(s).

Although the invention has been shown and described with respect to one or more particular preferred embodiments, it is clear that equivalent amendments or modifications will occur to the person skilled in the art when reading and interpreting the text and enclosed drawing(s) of this specification. In particular with regard to the various functions performed by the elements (components, assemblies, devices, compositions, etc.) described above, the terms used to describe such elements (including any reference to a "means") are intended, unless expressly indicated otherwise, to correspond to any element which performs the specified function of the element described, i.e. which is functionally equivalent to it, even if it is not structurally equivalent to the disclosed structure which performs the function in the example embodiment(s) illustrated here. Moreover, while a particular feature of the invention may have been described above with respect to only one or some of the embodiments illustrated, such a feature may also be combined with one or more other features of the other embodiments, in any way such as may be desirable or advantageous for any given application of the invention.

What is claimed is:

1. A method for ascertaining the position of a structure in a body, comprising the method steps of:
   providing 3D data which represents a three-dimensional image of at least the part of the body which contains the structure;
   providing at least two 2D image data sets which each represent an x-ray image of a part of the body containing at least the structure, from a known viewing direction;
   generating, using a computer, virtual x-ray images from the 3D data for a virtual position of the 3D data, wherein for each viewing direction for which a 2D image data set has been provided, a corresponding virtual x-ray image is generated;
   comparing the virtual x-ray images in pairs with the corresponding 2D image data sets and generating a cumulative degree of similarity for the virtual position of the 3D data from all the comparisons;
   repeating the steps of generating virtual x-ray images, comparing in pairs and generating a cumulative degree of similarity for different virtual positions of the 3D data; and
   ascertaining the position of the structure in the body from the virtual position of the 3D data which results in the greatest cumulative degree of similarity.

2. The method according to claim 1, wherein the x-ray images represented by the 2D image data sets each represent the body in the same state, by simultaneously generating a plurality of x-ray images from different viewing directions.

3. The method according to claim 1, wherein the x-ray images represented by the 2D image data sets each represent the body in the same state, by monitoring the state of the body and generating the x-ray images when the body is situated in a defined state.

4. The method according to claim 1, wherein the cumulative degree of similarity is calculated as the sum of the individual degrees of similarity of the comparisons in pairs.

5. The method according to claim 1, wherein the cumulative degree of similarity is calculated as the product of the individual degrees of similarity of the comparisons in pairs.

6. The method according to claim 1, wherein a penalty is additionally incorporated into the cumulative degree of similarity and depends on the deviation between the respective virtual position of the 3D data and an initial position.

7. The method according to claim 1, wherein the 3D data is segmented before generating the virtual x-ray images.

8. The method according to claim 1, wherein the virtual x-ray images are masked before the comparison in pairs.

9. The method according to claim 1, wherein the 3D data is modified in regions which do not contain the structure, before generating the virtual x-ray images.

10. The method according to claim 1, wherein the 3D data is filtered before generating the virtual x-ray images.

11. The method according to claim 1, wherein providing at least two 2D image data sets which each represent an x-ray image of a part of the body containing at least the structure comprises using an x-ray apparatus to obtain the at least two 2D image data sets.

12. A device for ascertaining the position of a structure in a body, comprising:
   an interface, configured to receive 3D data which represents a three-dimensional image of at least the part of the body which contains the structure, and to receive at least two 2D image data sets which each represent an x-ray image of a part of the body containing at least the structure, from a known viewing direction;
   a computational unit, configured to:
   generate virtual x-ray images from the 3D data for a virtual position of the 3D data, wherein for each viewing direction for which a 2D image data set has been provided, a corresponding virtual x-ray image is generated;

compare the virtual x-ray images in pairs with the corresponding 2D image data sets; and generate a cumulative degree of similarity for the virtual position of the 3D data, from all the comparisons, wherein the computational unit is also configured to repeat the steps of generating virtual x-ray images, comparing in pairs and generating a cumulative degree of similarity for different virtual positions of the 3D data, and to ascertain the position of the structure in the body from the virtual position of the 3D data which results in the greatest cumulative degree of similarity.

13. The device according to claim 12, comprising at least two x-ray apparatuses which have a known geometric arrangement with respect to each other.

14. The device according to claim 12, comprising a sensor for monitoring the state of the body.

15. A non-transitory computer readable medium comprising computer executable instructions adapted to cause a computer to ascertain the position of a structure in a body, comprising:

code that obtains 3D data which represents a three-dimensional image of at least the part of the body which contains the structure;

code that obtains at least two 2D image data sets which each represent an x-ray image of a part of the body containing at least the structure, from a known viewing direction;

code that generates virtual x-ray images from the 3D data for a virtual position of the 3D data, wherein for each viewing direction for which a 2D image data set has been provided, a corresponding virtual x-ray image is generated;

code that compares the virtual x-ray images in pairs with the corresponding 2D image data sets and generating a cumulative degree of similarity for the virtual position of the 3D data from all the comparisons;

code that repeats the steps of generating virtual x-ray images, comparing in pairs and generating a cumulative degree of similarity for different virtual positions of the 3D data; and code that ascertains the position of the structure in the body from the virtual position of the 3D data which results in the greatest cumulative degree of similarity.

* * * * *